United States Patent
Givelin et al.

(10) Patent No.: US 10,177,564 B2
(45) Date of Patent: Jan. 8, 2019

(54) HOT PLUGGING PROTECTION

(71) Applicant: FREESCALE SEMICONDUCTOR, INC., Austin, TX (US)

(72) Inventors: Philippe Jean-Marie Lucien Givelin, Leguevin (FR); Patrice Besse, Tournefeuille (FR); Serge De Bortoli, Ayguesvives (FR)

(73) Assignee: NXP USA, Inc., Austin, TX (US)

( * ) Notice: Subject to any disclaimer, the term of this patent is extended or adjusted under 35 U.S.C. 154(b) by 296 days.

(21) Appl. No.: 15/053,487

(22) Filed: Feb. 25, 2016

(65) Prior Publication Data
US 2017/0093151 A1    Mar. 30, 2017

(30) Foreign Application Priority Data
Sep. 25, 2015    (WO) .................. PCT/IB2015/002297

(51) Int. Cl.
*H02H 9/04*    (2006.01)
*H02H 9/00*    (2006.01)
*G06F 13/40*    (2006.01)

(52) U.S. Cl.
CPC ............ *H02H 9/045* (2013.01); *H02H 9/004* (2013.01); *H02H 9/046* (2013.01); *G06F 13/4081* (2013.01); *H02H 9/04* (2013.01)

(58) Field of Classification Search
USPC ............................... 361/56, 91, 111, 117–119
See application file for complete search history.

(56) References Cited

U.S. PATENT DOCUMENTS

| | | | |
|---|---|---|---|
| 4,484,244 A | 11/1984 | Avery | |
| 4,633,283 A | 12/1986 | Avery | |
| 4,941,063 A * | 7/1990 | McCartney | H02H 9/042 361/111 |
| 5,574,618 A | 11/1996 | Croft | |
| 6,810,458 B1 | 10/2004 | Bazargan et al. | |
| 6,922,320 B2 | 7/2005 | Ochi | |
| 8,294,422 B2 | 10/2012 | Tsumura | |

(Continued)

FOREIGN PATENT DOCUMENTS

| | | |
|---|---|---|
| WO | 2013108065 | 7/2013 |
| WO | 2014041388 | 3/2014 |

OTHER PUBLICATIONS

LTC6803-1/LTC6803-3, Linear Technology, Multicell Battery Stack Monitor, 2011, downloaded from <<http://cds.linear.com/docs/en/datasheet/680313fa.pdf>> on Apr. 27, 2015, 40 pages.

*Primary Examiner* — Danny Nguyen

(57) ABSTRACT

An overcharge protection circuit comprises a first series of first terminals a second series of second terminals, a first overvoltage protection device connected between each consecutive pair of first terminals, a current balancing device connected between each consecutive pair of second terminals, and a second overvoltage protection device connected between a first terminal and a second terminal. The second overvoltage protection device is configured to pass a current if a voltage over the second overvoltage protection device exceeds a threshold. The second overvoltage protection device may comprise a bidirectional ESD diode, while both the first overvoltage protection device and the second overvoltage protection device may comprise a unidirectional ESD diode.

20 Claims, 7 Drawing Sheets

(56) References Cited

U.S. PATENT DOCUMENTS

| | | |
|---|---|---|
| 9,722,419 B2 | 8/2017 | Besse et al. |
| 2005/0045909 A1 | 3/2005 | Zhang |
| 2007/0058307 A1 | 3/2007 | Mergens |
| 2008/0316659 A1 | 12/2008 | Oguzman et al. |
| 2011/0058293 A1 | 3/2011 | Pardoen et al. |
| 2012/0007649 A1 | 1/2012 | Rankin |
| 2012/0194953 A1* | 8/2012 | Mikolajczak .......... H02H 9/046 361/56 |
| 2013/0285196 A1 | 10/2013 | Dissegna et al. |
| 2014/0247013 A1 | 9/2014 | Mizoguchi |
| 2014/0306662 A1* | 10/2014 | Kim ..................... H02J 7/0016 320/118 |

\* cited by examiner

HOT PLUGGING PROTECTION

CROSS REFERENCE TO RELATED APPLICATION(S)

The present application claims priority to International Patent Application No. PCT/IB2015/002297, entitled "HOT PLUGGING PROTECTION," filed on Sep. 25, 2015, the entirety of which is herein incorporated by reference.

FIELD OF THE INVENTION

This invention relates to a hot plugging protection circuit. More in particular, the invention relates to an overcharge protection circuit which provides protection against overcharges resulting from so-called hot plugging.

BACKGROUND OF THE INVENTION

Hot plugging is a term referring to the addition of components to an electronic system, such as a computer system, without significant interruption to the operation of the system. Stated differently, hot plugging refers to adding component to an electronic system while the system is switched on. The components being added can be circuit boards, batteries or other components. When battery stacks are added to a running system, typically not all contact terminals of the stack connect at the same moment. This may cause local overvoltages in the system, which may damage its components. Hot plugging protection circuits are designed to protect an electronic system and its components from such damage.

BRIEF DESCRIPTION OF THE DRAWINGS

The invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

The invention provides an overcharge protection circuit which is configured to provide protection against both overvoltages and overcurrents which may occur when battery stacks are connected to additional circuitry. Embodiments of the protection circuit according to the invention include overvoltage protection devices connected between pairs of terminals of a first set of terminals, and current balancing devices connected between pairs of terminals of a second, different set of terminals. Between the sets of terminals, further overvoltage protection devices are connected for providing overcharge protection between the sets of terminals. These further overcharge protection devices include bidirectional ESD (Electrostatic Discharge) diodes, for example, but not limited to, Zener diodes. The bidirectional ESD diode arrangement provides overcurrent protection in two directions. The invention provides protection against both overvoltages and overcurrents with a small number of components.

In the following, for the sake of understanding, the circuitry is described in operation. However, it will be apparent that the respective elements are arranged to perform the functions being described as performed by them.

The invention will be explained with reference to hot plugging battery stacks. However, the invention is not so limited and may be applied with other items which can be hot plugged, such as circuit boards, for example.

Figure 1:
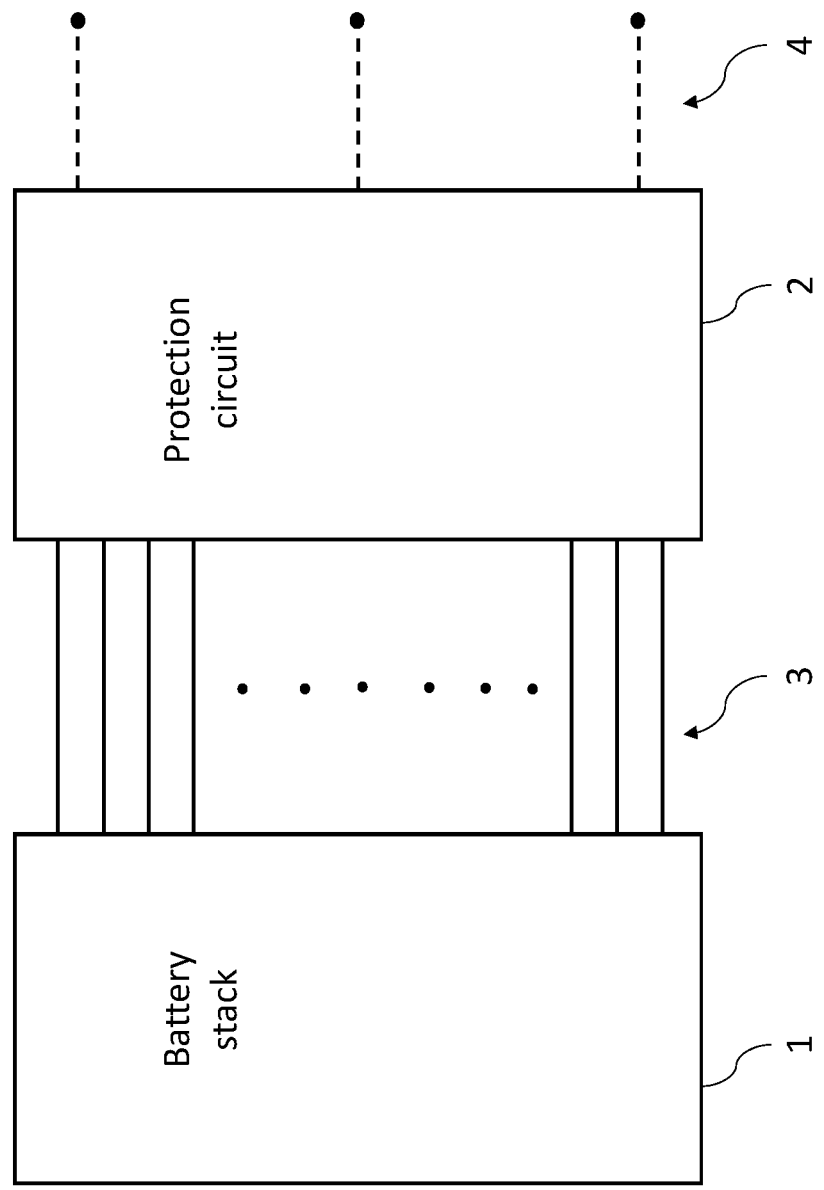
FIG. 1 schematically shows an example of an embodiment of a battery stack and a protection circuit according to the Prior Art.

A battery stack and associated circuitry according to the prior art are schematically illustrated in FIG. 1. In the example of FIG. 1, a battery stack 1 is connected to a protective circuit 2 through connecting circuitry 3. The battery stack 1 can consist of two or more batteries, for example six or fourteen batteries, which are typically arranged in series to produce a total voltage equal to the sum of the voltages of the individual batteries of the stack. The connections of the connection circuitry 3 typically allow access to the individual batteries. This allows the voltages of the individual batteries to be monitored, and also allows to obtain smaller voltage values than the voltage of the entire stack. The connecting circuitry is shown to include connections only but may include additional circuitry, such as resistors and capacitors, as will later be discussed with reference to FIGS. 2 to 4.

The protection circuit 2 may further be connected to connection circuitry 4 which is configured for allowing additional circuits to be connected to the battery stack 1, through the protective circuit 2.

Figure 2:
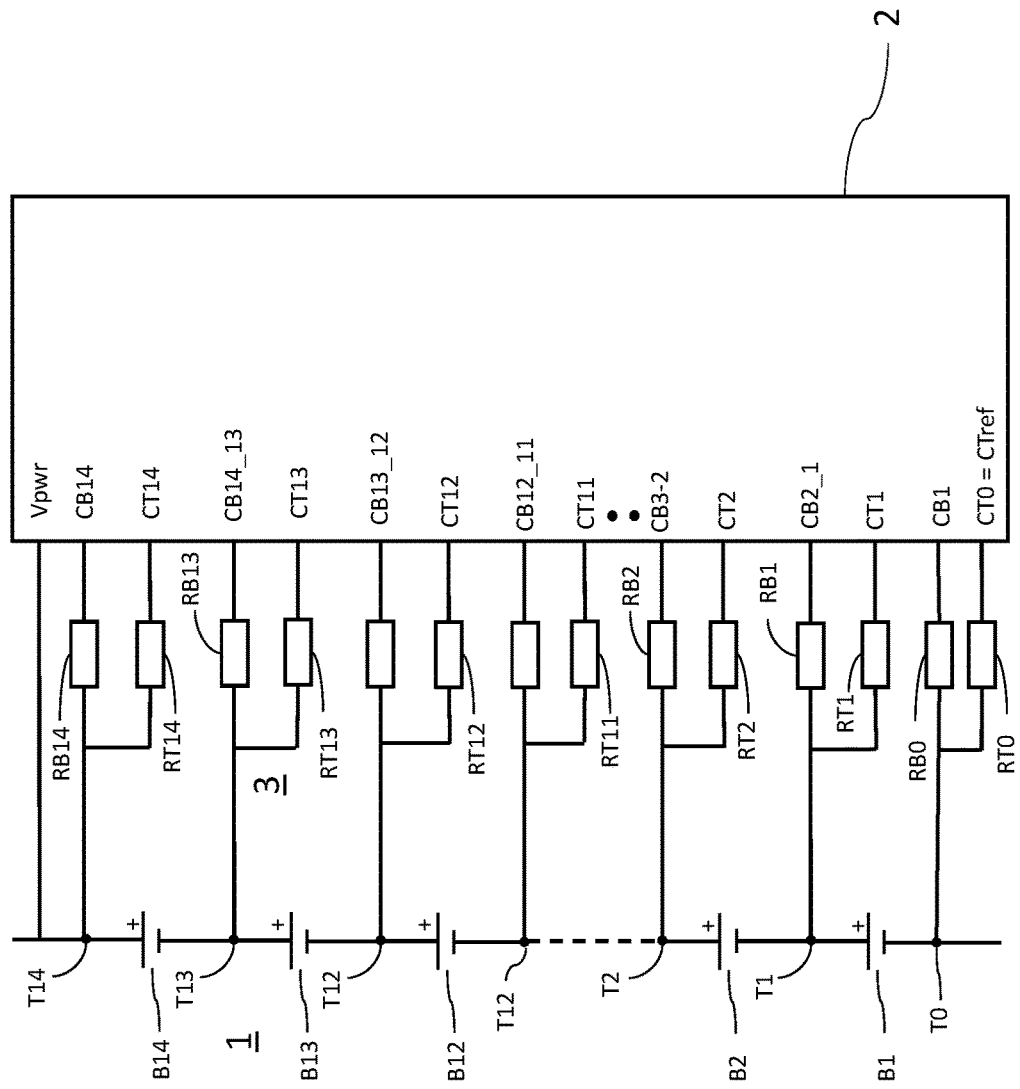
FIG. 2 schematically shows an example of a battery stack and a protection circuit according to the invention.

The battery stack 1, the protective circuit 2 and the connecting circuitry 3 are shown in more detail in FIG. 2. The exemplary battery stack 1 of FIG. 2 includes 14 battery cells B1-B14. Each cell has two terminals which are connected to respective nodes of a series of nodes T0-T14. It can be seen that the battery stack 1 constitutes a series arrangement of battery cells.

The protective circuit 2 has a number of terminals that can be connected to the battery stack 1 via the connecting circuitry 3. These terminals include cell balancing (CB) terminals, cell testing (CT) terminals, and at least one power terminal Vpwr. The cell balancing terminals CB1-CB14 are used for providing power, while the cell testing terminals CT0-CT14 are used for sensing and testing. It can be seen in FIG. 2 that the cell balancing terminals CB1 to CB14 are connected to the respective nodes T0 and T14 through a connection with a resistor RB0 to RB14 respectively. The intermediate cell balancing terminals are effectively shared between the cells and are therefore labelled CBXX_YY, for example CB14_13 for the cell balancing terminal between cells T14 and T13.

In the embodiment shown, the cell testing terminals CT0-CT14 are connected to the respective nodes T0-T14 through respective resistors RT0-RT14. In an embodiment, the resistors RT0-RT14 have a resistance of 2 k$\Omega$ while the resistors RB0-RB14 have a resistance of 39$\Omega$. In some embodiments, at least some of the resistors RB0-RB14 may have a value of 0$\Omega$ and thus effectively constitute a direct connection having no resistance. In some embodiments, the resistors RT0-RT14 may have a resistance of less or more than 2 k$\Omega$. It is noted that the first cell testing terminal CT0 may also be referred to as reference cell testing terminal CTref.

When a battery stack, such as the battery stack 1 shown in FIGS. 1 and 2, is connected to a circuit, not all terminals will make contact at exactly the same instant. This may be due to physical properties of the connectors used, such as not all contact pins of a connector having exactly the same length. Thus some pins may establish an electrical connection before other pins do so. In the embodiment of FIG. 2, for example, the connections between node T12 and terminal CB13_12 on the one hand and between node T2 and terminal CB3_2 on the other hand may be established before other connections are made. This may lead to different, and sometimes higher voltages being applied to the terminals of the protection circuit when making a connection than during normal operation. The protective circuit 2 serves to prevent any damage due to these voltages, and in particular serves to protect any further electronic circuits from these detrimental effects. It is for this reason that the protective circuit 2 is connected between the battery stack 1 and any further circuitry 4. The protective circuit 2 may have additional functions, such as monitoring the battery stack.

Figure 3A:
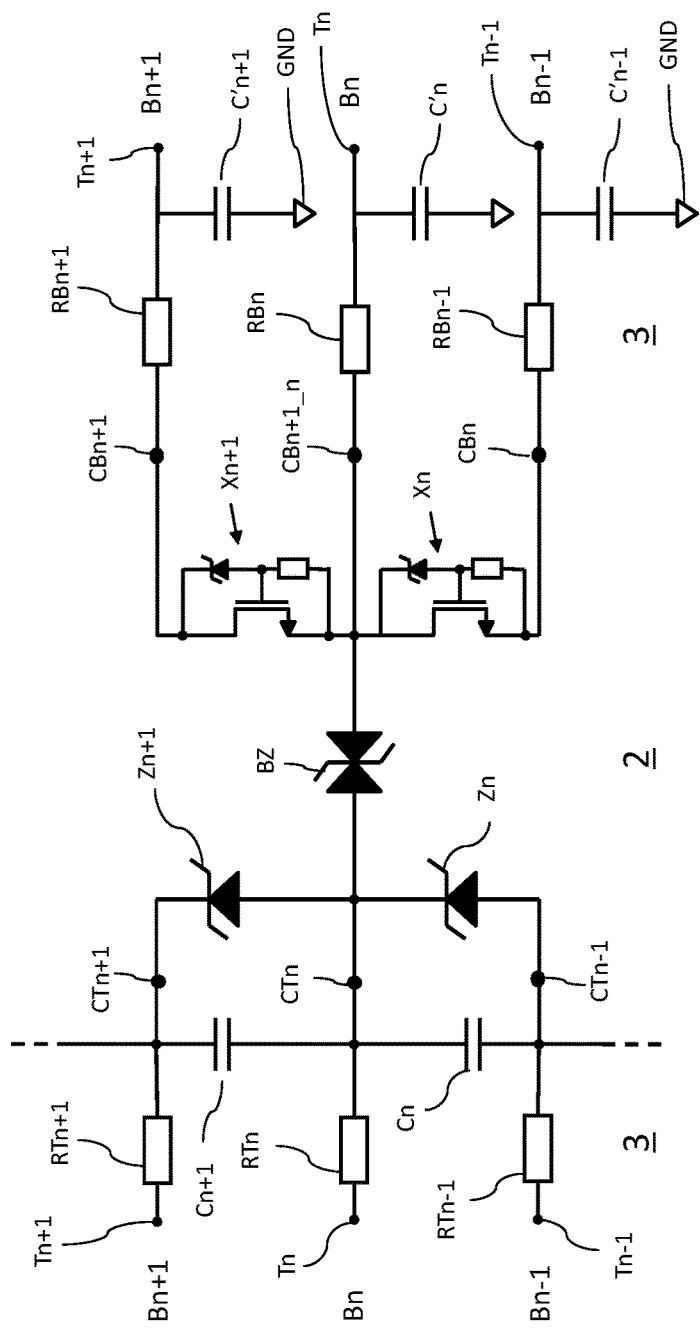
FIGS. 3a-3d schematically show embodiments of a protection circuit according to the invention.

An embodiment of an overcharge protection circuit according to the invention is schematically illustrated in FIG. 3a. The overcharge protection circuit shown in FIG. 3a may be used for a battery stack of two batteries, but will typically be incorporated in a larger overcharge protection circuit having terminals for connecting more batteries. In FIG. 3a, the circuit 3 is shown to be connected to the $n^{th}$ battery (for example the $12^{th}$ battery B12 in FIG. 2, connected via battery terminal T12), the $n-1^{th}$ battery (for example the $11^{th}$ battery B11, via battery terminal T11) and the $n+1^{th}$ battery (for example the $13^{th}$ battery via battery terminal T13). The overcharge protection circuit 2 of FIG. 3a may readily be made suitable for larger battery stacks by duplication of the circuit.

The battery protection circuit 2 is provided with first or cell testing terminals CTn−1, CTn and CTn+1, and with second or cell balancing terminals CBn−1, CBn+1_n and CBn+1. The cell balancing terminal CBn+1_n refers to a common cell balancing terminal, for example the cell balancing terminal CB14_13 which is, via battery terminal T13, common to battery cells B13 and B14.

For the sake of simplicity of the drawings, the connecting circuitry 3 is shown in FIG. 3a both to the left and to the right of the protective circuit 2. It will therefore be understood that the resistors RBn and RTn will be connected to the same battery terminal (Tn) of the battery cell Bn.

The connecting circuitry 3 is shown to further include capacitors Cn and Cn+1 connected between the terminals CTn−1 and CTn, and between the terminals CTn and CTn+1 respectively. In addition, the connecting circuitry 3 is shown to further include capacitors C'n−1, C'n and C'n+1 connected between the battery cells Bn−1 and ground, Bn and ground, and Bn+1 and ground respectively. These capacitors can absorb voltage fluctuations while the resistors serve for current limitation and transient attenuation.

The embodiment of the protection circuit 2 shown in FIG. 3a includes a first overvoltage protection device connected between each consecutive pair of cell testing terminals, an overcurrent device connected between each consecutive pair of cell balancing terminals, and a second overvoltage protection circuit connected between the cell testing terminal CTn and the cell balancing terminal CBn+1_n.

In the embodiment shown, the first overvoltage protection devices Zn and Zn+1 each include an ESD diode connected in reverse polarity between the cell testing terminal having a higher voltage (typically CTn+1) and the cell testing terminal having a lower voltage (typically CTn). As is well known, an ESD diode will, when connected in reverse polarity, have a high resistance up to its ESD voltage, at which point the resistance will sharply decrease. Any voltage over the ESD diode in excess of the ESD threshold will therefore cause a current to flow through the ESD diode, as a result of which the voltage will decrease, effectively providing an overvoltage protection.

In the embodiment shown, the current balancing devices Xn and Xn+1 each include a controlled electronic switch including a transistor, in the example shown a MOSFET type transistor. The controlled electronic switches each include an ESD diode and a bias resistor, which together provide a control voltage for the (gate of the) transistor. The ESD diodes of the controlled electronic switches are connected with reverse polarity to define an ESD voltage between the gate and the drain of each transistor. When the voltage difference between the currently balancing terminals CBn+1 and CBn+1_n, for example, exceeds the ESD voltage, the ESD diode of the electronic switch starts conducting, thereby raising the gate-source voltage of the transistor, and thus causing the transistor to conduct and the electronic switch to be closed. In this way, a current balancing effect is achieved.

In the embodiment shown in FIG. 3a, the current testing terminal CTn and the current balancing terminal CBn+1_n are directly connected by a second overvoltage device BZ. This second overvoltage protection device is configured to pass a current if the voltage over the second overvoltage protection device exceeds a threshold. As a result, any voltage higher than the threshold voltage will cause current to flow through the second overvoltage protection device, thus lowering the higher voltage until it reaches the clamp voltage.

The second overvoltage device BZ of FIG. 3a is constituted by a bidirectional ESD diode. Such diodes, which are known per se, offer the advantage of providing overvoltage protection in two directions. It is therefore not relevant whether the overvoltage occurs at the cell testing terminal CTn or at the cell balancing terminal CBn+1_n, in either case will an overvoltage be neutralized by the overvoltage device BZ.

It is noted that in the embodiment of FIG. 3a, the current testing terminal CTn+1 and the current balancing terminal CBn+1 are not connected by a second overvoltage device. Similarly, the current testing terminal CTn−1 and the current balancing terminal CBn−1 are not connected by a second overvoltage device either. The single overvoltage protection device BZ therefore provides overvoltage protection for all three terminals.

It is noted that overvoltages may particularly occur due to the presence of the capacitors Cn and Cn+1, and that these capacitors can readily discharge via the overvoltage protection device BZ. As mentioned above, the resistors RBn and RTn are both connected to the same battery cell Bn and are therefore provide a discharge path.

Figure 3B:
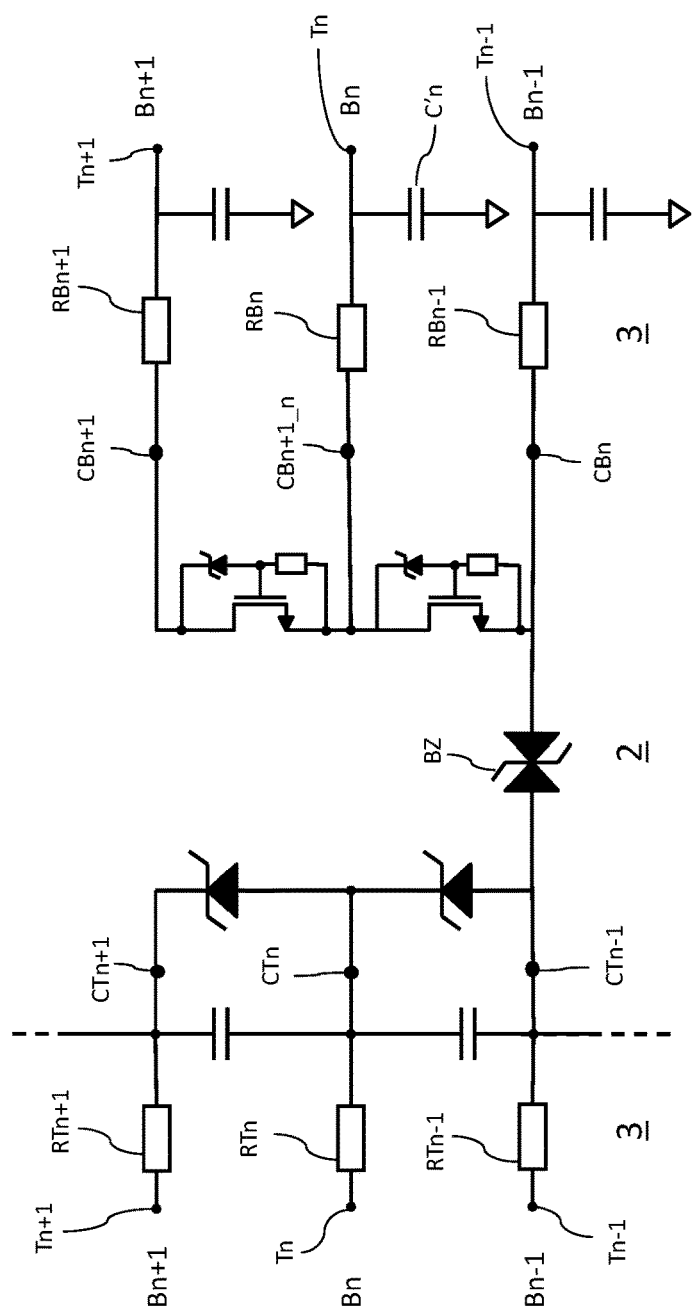

The embodiment of the protection circuit 2 shown in FIG. 3b also includes a first overvoltage protection device connected between each consecutive pair of cell testing terminals, an overcurrent device connected between each consecutive pair of cell balancing terminals, and a second overvoltage protection circuit. In this embodiment, however, the second overvoltage protection device BZ is connected between the cell testing terminal CTn−1 and the cell balancing terminal CBn. In this way, an alternative overvoltage protection for three terminals is provided. An embodiment can be envisaged in which an overvoltage protection device BZ is connected between the terminals CTn+1 and CBn+1.

Figure 3C:
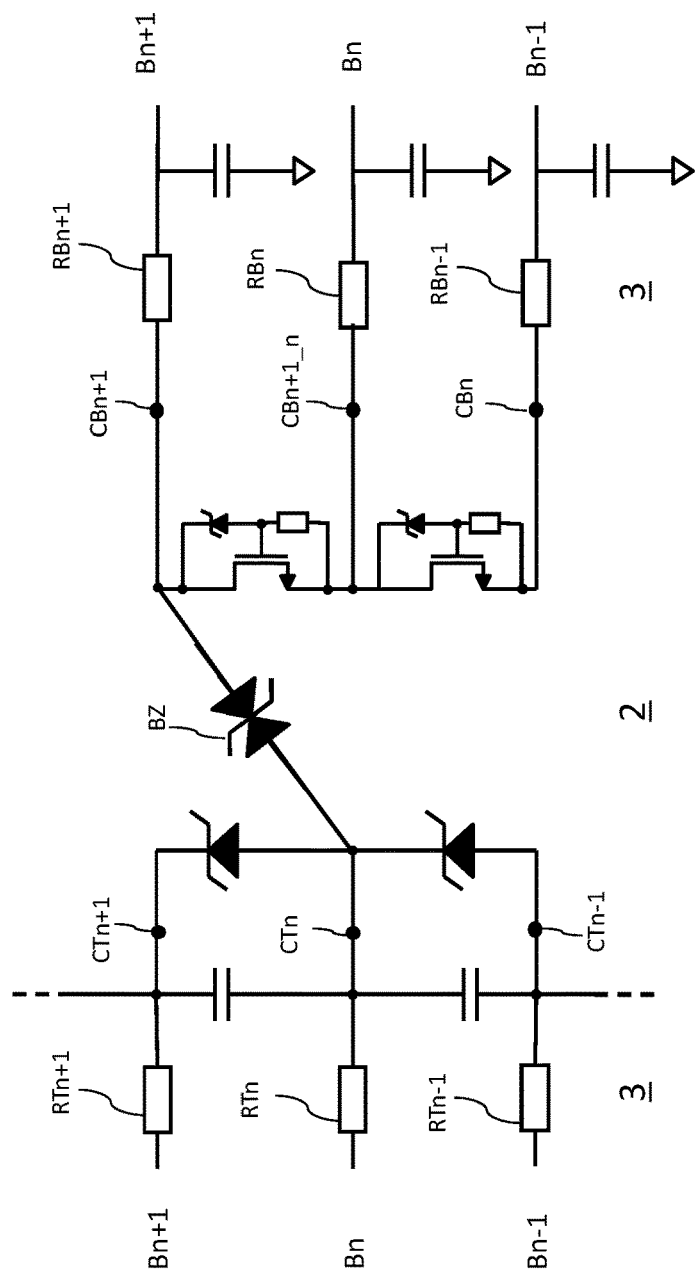

The embodiment of the protection circuit 2 shown in FIG. 3c also includes a first overvoltage protection device connected between each consecutive pair of cell testing terminals, an overcurrent device connected between each consecutive pair of cell balancing terminals, and a second overvoltage protection circuit. In this embodiment, however, the second overvoltage protection device BZ is connected between the cell testing terminal CTn and the cell balancing terminal CBn+1. In this way, yet another alternative overvoltage protection for three terminals is provided.

The embodiments of FIGS. 3a, 3b and/or 3c may be combined to provide additional overvoltage protection. Additionally, or alternatively, the protection circuits of any of FIGS. 3a, 3b and 3c may be duplicated one or more times to serve more than three terminals. Duplicated protection circuits 2 may overlap.

Figure 3D:
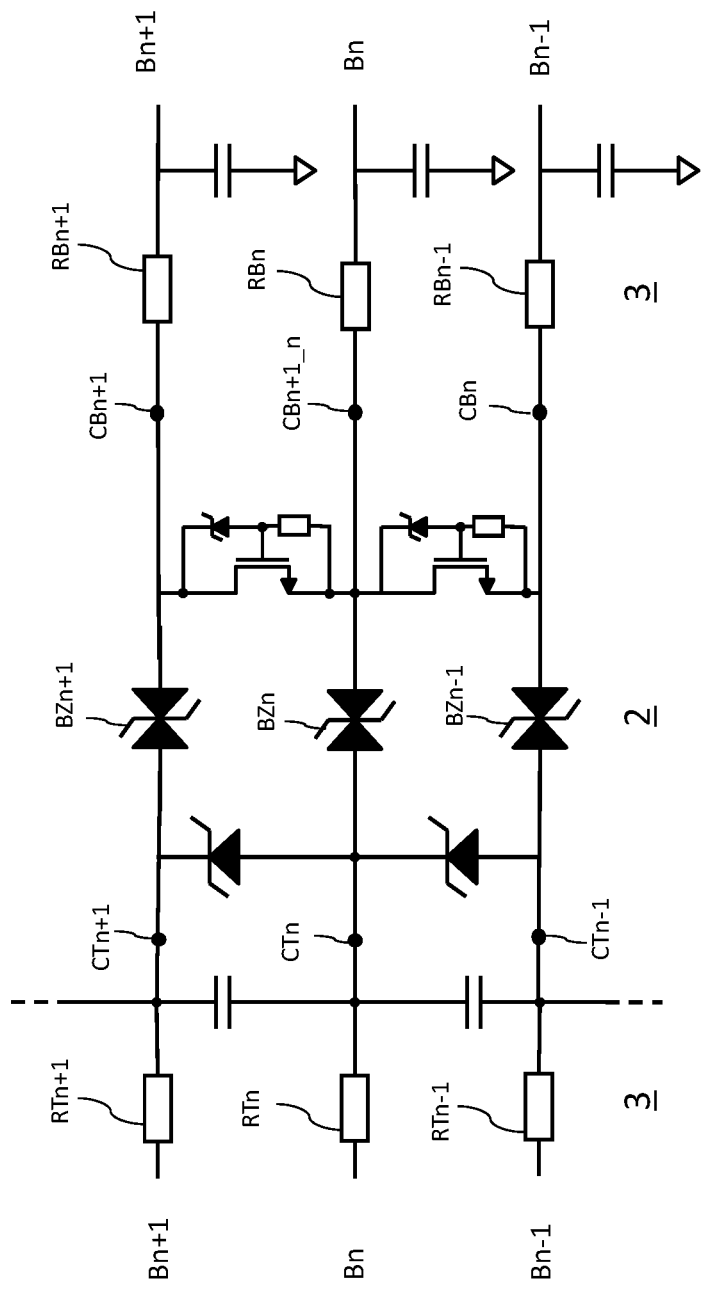

The embodiment of the protection circuit 2 shown in FIG. 3d includes three overvoltage protection devices BZn−1, BZn and BZn+1 connected between terminals CTn−1 and CBn, terminals CTn and CBn+1_n, and terminals CTn+1 and CBn+1 respectively. In this embodiment, an overvoltage protection device is provided for each pair of cell testing-current balancing terminals.

Figure 4:
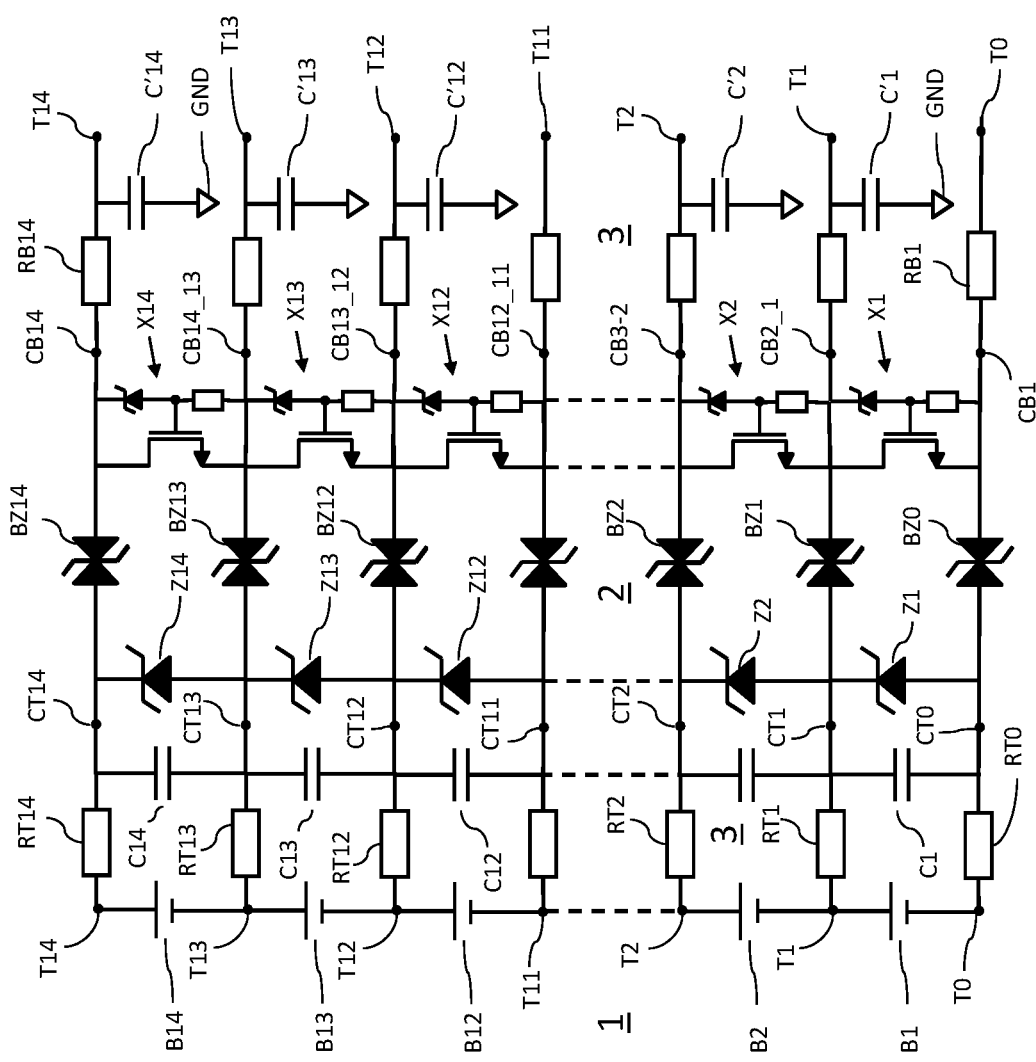
FIG. 4 schematically shows an example of an embodiment of a battery stack and a protection circuit according to the invention.

A further embodiment of the protection device 2, together with a battery stack 1 and connecting circuitry 3, is illustrated in FIG. 4. In the embodiment of FIG. 4, the battery stack 1 includes fourteen batteries B1 to B14, which are connected between battery terminals T0 to T14. As in FIGS. 3a to 3d, the terminals T0 to T14 are shown on both sides of the diagram. It will be understood that, for example, the two terminals T2 shown in FIG. 4 are in fact one and the same terminal, connected to the positive side of battery cell B2. It will further be understood that the number of fourteen battery cells is only an example and that the protection circuit of the invention can also be configured for larger or smaller numbers of battery cells, for example six battery cells.

Each battery terminal T0 to 14 is connected via respective resistors RT0 to RT14 to cell testing terminals CT0 to CT14. In addition, the first and last battery terminals T0 and T14 are connected via respective resistors RB1 and RB14 to current balancing terminals CB1 and CB14 respectively, while the remaining battery terminals T1 to T13 are directly connected to cell balancing terminals CB2_1 to CB14_13 of the overvoltage protection circuit 2.

The connecting circuitry 3 of FIG. 4 is shown to include, in addition to the resistors RT0-RT14, RB0 and RB14 shown in FIG. 2, capacitors C1-C14 and C0-C'14. The capacitors C1-C14 are each connected between two cell testing terminals, for example the capacitor C12 being connected between cell testing terminals CT11 and CT12. The capacitors C0-C'14 are each connected between a node and ground, for example the capacitor C'2 being connected between node T2 and ground.

In the embodiment of FIG. 4, each pair of cell testing and current balancing terminals CT0-CB1 to CT14-CB14 is connected through an overvoltage protection device BZ0 to BZ14. In the embodiment shown, each overvoltage protection device BZ0 to BZ14 is constituted by a bidirectional ESD diode. As shown in FIGS. 3a-3c, it is not required for each terminal T0-T14 to be connected to an overvoltage protection device BZ0-BZ14. In the present example of 15 (=14+1) terminals, only the odd-numbered overvoltage protection devices BZ1, BZ3, . . . , BZ13 may be present, the even-numbered overvoltage protection devices BZ0, BZ2, . . . , BZ14 being omitted. Alternatively, only the even-numbered overvoltage protection devices BZ0, BZ2, . . . , BZ14 may be present while the odd-numbered overvoltage protection devices BZ1, BZ3, . . . , BZ13 are omitted. In still other embodiments, only one overvoltage protection device may be present per three terminals (compare FIGS. 3a - 3c), for example only overvoltage protection devices BZ1, BZ4, BZ7, BZ10 and BZ13. It will be understood that other arrangements are possible, also in embodiments where more or less than 15 terminals are used.

It is noted that the protection circuit 2 may be implemented as a single integrated circuit, which in preferred embodiments requires no external components.

An embodiment of the invention may be summarized as an overcharge protection circuit including a first series of first terminals, a second series of second terminals, a first overvoltage protection device connected between each consecutive pair of first terminals, a current balancing device connected between each consecutive pair of second terminals, and a second overvoltage protection device connected between a first terminal and a second terminal, wherein the second overvoltage protection device is configured to pass a current if a voltage over the second overvoltage protection device exceeds a threshold.

Another embodiment of the invention may be summarized as a battery stack control circuit including a first series of first terminals, a second series of second terminals, a first overvoltage protection device connected between each consecutive pair of first terminals, a current balancing device connected between each consecutive pair of second terminals, and a second overvoltage protection device connected between a first terminal and a second terminal, wherein the second overvoltage protection device is configured to pass a current if a voltage over the second overvoltage protection device exceeds a threshold, wherein the first terminals are configured to measure a voltage of batteries of the battery stack, and wherein the second terminals are configured to drive a current of batteries of the battery stack.

Yet another embodiment of the invention may be summarized as an apparatus including a stack of batteries having a set of battery terminals, and at least one overcharge protection circuit including a first series of first terminals, a second series of second terminals, a first overvoltage protection device connected between each consecutive pair of first terminals, a current balancing device connected between each consecutive pair of second terminals, and a second overvoltage protection device connected between a first terminal and a second terminal, wherein the second overvoltage protection device is configured to pass a current if a voltage over the second overvoltage protection device exceeds a threshold, and wherein each battery terminal is connected to both a first terminal and a corresponding second terminal.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An overcharge protection circuit comprising
a first series of first terminals;
a second series of second terminals;
a first overvoltage protection device connected between each consecutive pair of first terminals;
a current balancing device connected between each consecutive pair of second terminals; and
a second overvoltage protection device connected between a first terminal and a second terminal;
wherein the second overvoltage protection device is configured to pass a current if a voltage over the second overvoltage protection device exceeds a threshold.

2. The overcharge protection circuit according to claim 1, wherein the second overvoltage protection device comprises a bidirectional ESD diode.

3. The overcharge protection circuit according to claim 1, wherein the first overvoltage protection device comprises a unidirectional ESD diode.

4. The overcharge protection circuit according to claim 1, wherein the current balancing device comprises an electronic switch.

5. The overcharge protection circuit according to claim 4, wherein the electronic switch is configured to be controlled by an ESD diode.

6. The overcharge protection circuit according to claim 1, wherein the first series and the second series comprise equal numbers of terminals.

7. The overcharge protection circuit according to claim 1, wherein a second overvoltage device is connected between each terminal of the first series and each corresponding terminal of the second series.

8. A battery stack control circuit comprising
a first series of first terminals;
a second series of second terminals;
a first overvoltage protection device connected between each consecutive pair of first terminals;
a current balancing device connected between each consecutive pair of second terminals; and
a second overvoltage protection device connected between a first terminal and a second terminal,
wherein the second overvoltage protection device is configured to pass a current if a voltage over the second overvoltage protection device exceeds a threshold;
wherein the first terminals are configured to measure a voltage of batteries of the battery stack; and
wherein the second terminals are configured to drive a current of batteries of the battery stack.

9. The overcharge protection circuit according to claim 8, wherein the second overvoltage protection device comprises a bidirectional ESD diode.

10. The overcharge protection circuit according to claim 8, wherein the first overvoltage protection device comprises a unidirectional ESD diode.

11. The overcharge protection circuit according to claim 8, wherein the current balancing device comprises an electronic switch.

12. The overcharge protection circuit according to claim 11, wherein the electronic switch is configured to be controlled by an ESD diode.

13. The overcharge protection circuit according to claim 8, wherein the first series and the second series each comprise fifteen terminals.

14. An apparatus comprising
a stack of batteries having a set of battery terminals; and
at least one overcharge protection circuit comprising
a first series of first terminals;
a second series of second terminals;
a first overvoltage protection device connected between each consecutive pair of first terminals;
a current balancing device connected between each consecutive pair of second terminals; and
a second overvoltage protection device connected between a first terminal and a second terminal;
wherein the second overvoltage protection device is configured to pass a current if a voltage over the second overvoltage protection device exceeds a threshold; and
wherein each battery terminal is connected to both a first terminal and a corresponding second terminal.

15. The apparatus according to claim 14, wherein the second overvoltage protection device comprises a bidirectional ESD diode.

16. The apparatus according to claim 14, wherein the first overvoltage protection device comprises a unidirectional ESD diode.

17. The apparatus according to claim 14, wherein the second overvoltage protection device comprises an electronic switch configured to be controlled by an ESD diode.

18. The apparatus according to claim 14, wherein each first terminal is connected to a battery terminal via a resistor.

19. The apparatus according to claim 14, wherein the first terminals are configured to
measure a voltage of batteries of the battery stack; and
wherein the second terminals are configured to drive a current of batteries of the battery stack.

20. The apparatus according to claim 19, wherein a lowest voltage battery terminal and a highest voltage battery terminal are connected to a respective second terminal via a resistor.

* * * * *